Oct. 5, 1965
C. C. WILLIAMS
3,209,854
IMPACT APPARATUS FOR GENERATING A SONIC
IMPULSE EMPLOYED IN SEISMIC
GEOLOGICAL EXPLORATION
Filed Dec. 12, 1960
3 Sheets-Sheet 1
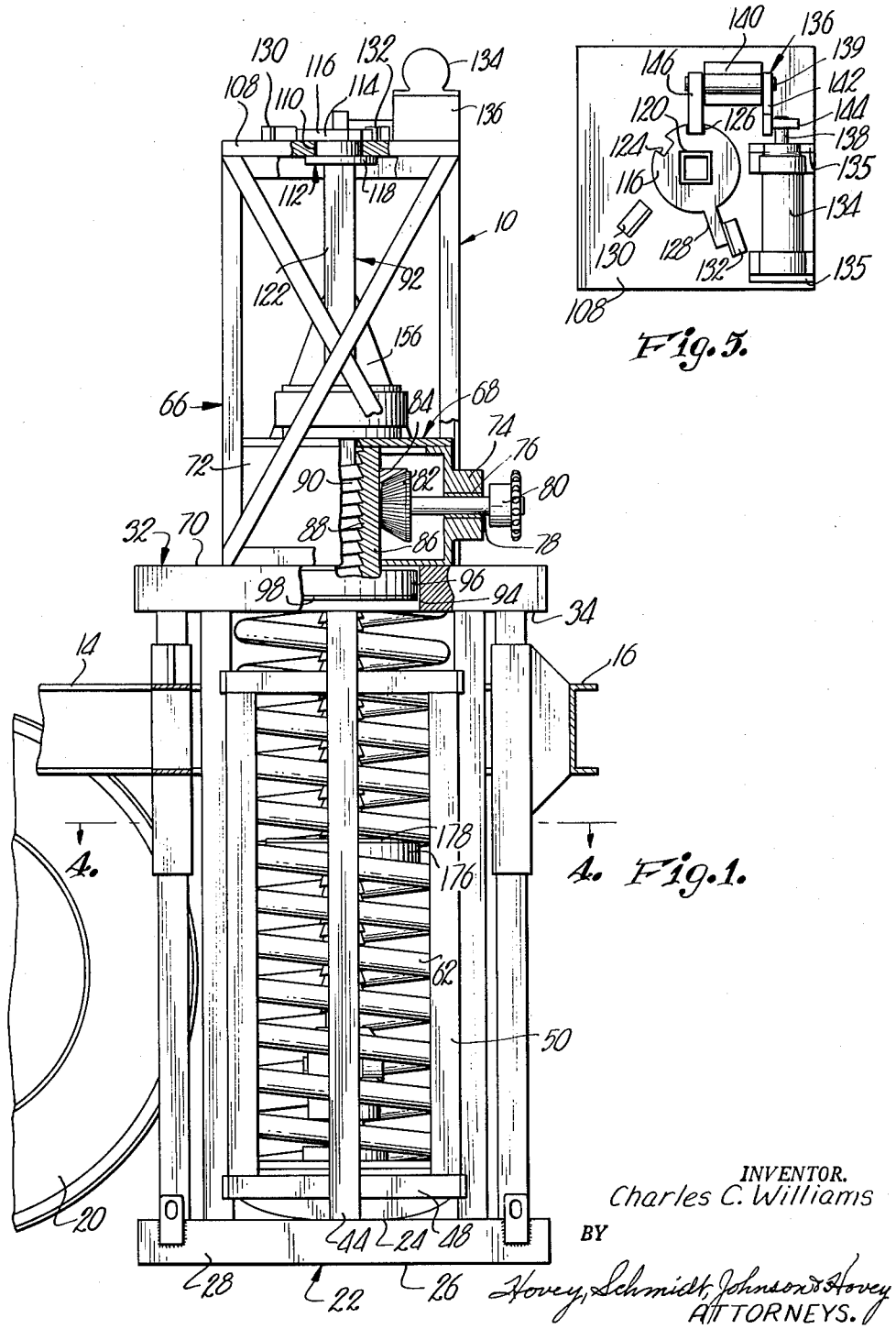
INVENTOR.
Charles C. Williams
BY
Hovey, Schmidt, Johnson & Hovey
ATTORNEYS.

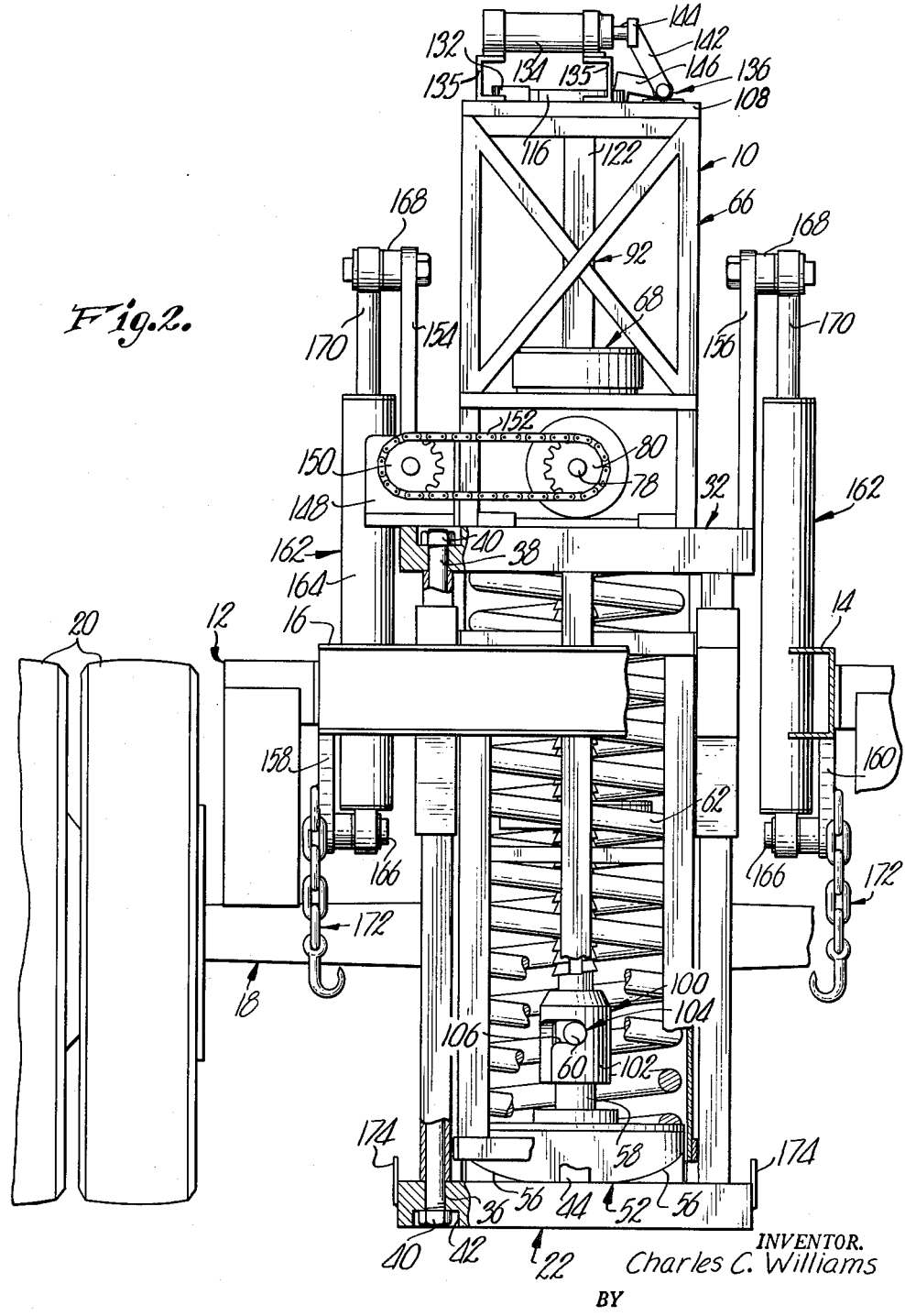

Oct. 5, 1965 C. C. WILLIAMS 3,209,854
IMPACT APPARATUS FOR GENERATING A SONIC
IMPULSE EMPLOYED IN SEISMIC
GEOLOGICAL EXPLORATION
Filed Dec. 12, 1960 3 Sheets-Sheet 3
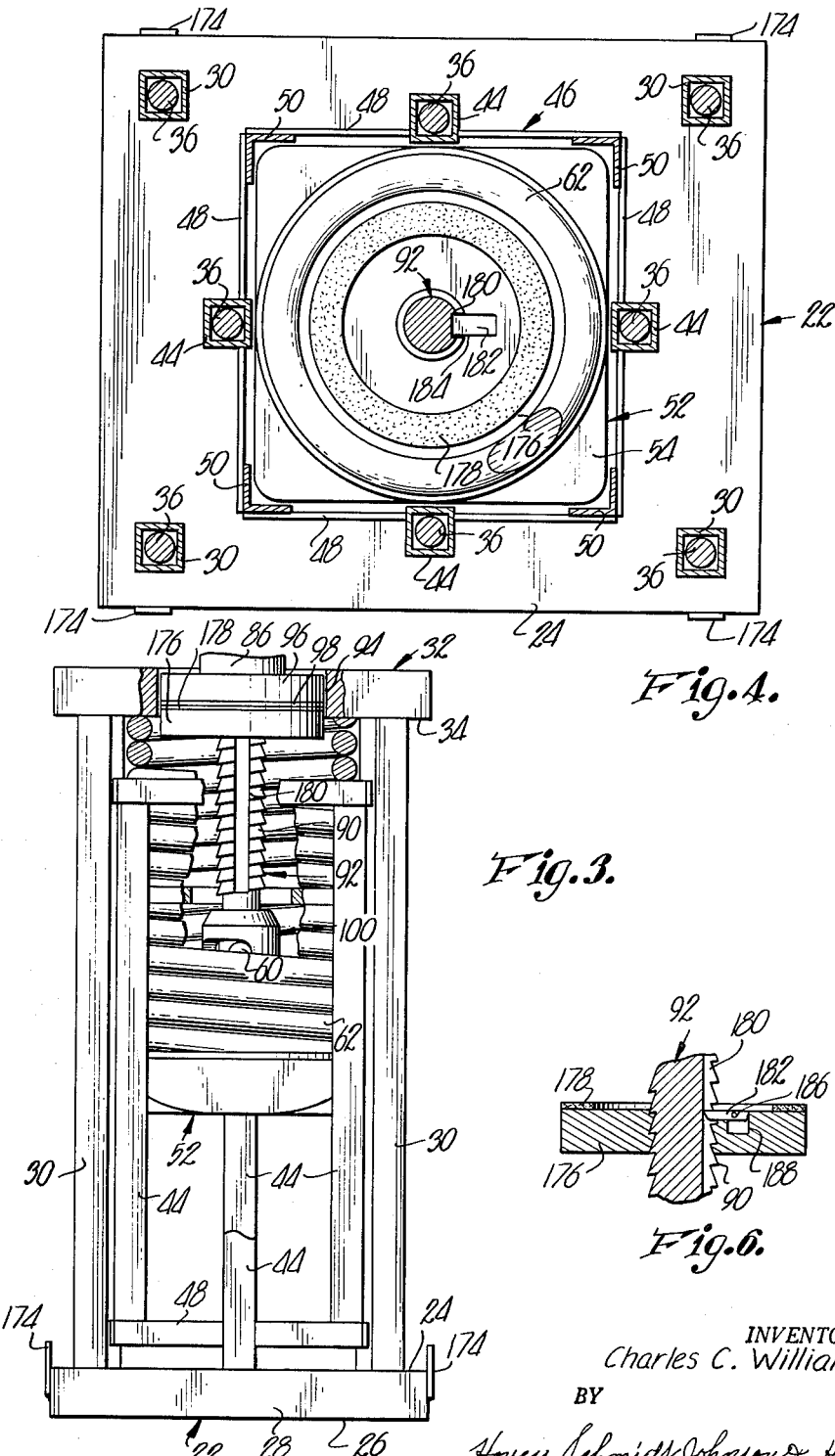
INVENTOR.
Charles C. Williams
BY
Hovey Schmidt Johnson & Hovey
ATTORNEYS

3,209,854
IMPACT APPARATUS FOR GENERATING A SONIC IMPULSE EMPLOYED IN SEISMIC GEOLOGICAL EXPLORATION
Charles C. Williams, Wichita, Kans., assignor to Imperial Industries, Inc., Wichita, Kans., a corporation of Kansas
Filed Dec. 12, 1960, Ser. No. 75,346
9 Claims. (Cl. 181—.5)

This invention relates to equipment utilized in geological exploration, as well as to an improved method of conducting seismic studies, with the primary object being to provide a unique method of generating a sonic pulse of optimum characteristics in the ground and to provide inexpensive and efficient apparatus for producing such impulse.

Seismic geological studies have been made for many years in an effort to find petroleum deposits located well below the earth's surface, and the art has become highly refined in recent years with respect to the equipment employed to interpret the sonic pulses which are caused to pass through the ground upon generation of the impulse adjacent or on the earth's surface. However, the apparatus and means for producing the sonic impulses has not changed to any marked degree throughout the period of refinement of the seismic pickup equipment. The conventional method of producing a sonic impulse in the ground is the detonation of explosives, either on the earth's surface or preferably in a suitable shot hole of predetermined depth. In recent years, another sonic impulse generating method has been developed relating to dropping of a relatively heavy weight from a considerable altitude to thereby generate seismic power in the ground which can be picked up and read by seismic jugs disposed in predetermined relationship with respect to the source of seismic energy. However, the explosive and weight dropping procedure suffer from inherent defects which restrict the use and value thereof, and it is therefore a significant object of the instant invention to provide a new and highly efficient means of generating seismic impulses of such characteristics and intensity as to be useful in seismic geological exploratory surveys related to the search for petroleum deposits.

Explosives provide a convenient and fairly predictable source for the generation of seismic energy of such form and intensity as to provide a practical basis for seismic geological exploration. However, explosives as a means for creating the seismic impulse are highly inefficient, and the use of explosives necessitates in many instances, complicated and time consuming procedures, particularly with respect to handling and detonation thereof. The use of explosives is also of disadvantage because of the necessity of utilization of shot holes of varying depths for the charges and therefore the requirement of drills and related equipment and personnel for the purpose of preparing the shot holes, loading of the holes, and detonation of the explosive material. It is to be pointed out that the cost of seismic exploration and directly related to the powder and the means for utilizing such powder forms an appreciable portion of the total cost of the seismic survey.

Weight dropping as a means for the generation of seismic power in general provides a considerable reduction in the cost of seismic exploration in certain "high cost" areas wherein, because of geological conditions, the use of powder would require several or many simultaneous explosions to create the necessary seismic power. However, for general application in so-called "normal" areas, weight dropping is subject to severe limitations. Weight dropping equipment is heavy, of special design and relatively expensive. Recordings derived using weight dropping usually involve many drops of the weight, and the proper utilization of this source of sonic impulse in the ground involves the use of highly specialized, complicated and expensive recording equipment. Therefore, the cost of such special equipment in general militates against the use of weight dropping in areas where single shot holes, and normal recording procedures, provide the requisite seismic data.

It is therefore an important object of the present invention to provide an inherently simple device for generating a sonic impulse in the ground and capable of being employed for geological exploration purposes, as well as a method which may be practiced at a considerable saving over prior procedures not only with respect to time involved in making the survey but also the personnel required and the actual cost of the equipment used.

Also a significant object of the present invention is to provide apparatus for generating a sonic impulse employed in seismic geological exploration wherein the pulse is produced by very simple components including primarily a massive and rigidly earth coupled anvil, a massive hammer disposed to impactively engage the anvil, and a heavy spring engaging the hammer in a manner to acceleratedly drive the latter into contact with the anvil whereby the impulse generator is of relatively low cost, may be readily transported from one area to another, is highly efficient in operation, may be utilized to peruse any number of impulses in successive order and in a short period of time, requires very little power for operation thereof, and is adapted for utilization in all areas whether the same be of the so-called normal or high cost characteristics, and which may be employed with conventional seismic recording equipment without modification thereof being required in any manner.

Another important object of the invention is to provide apparatus of the type described wherein the massive, rigid anvil is forcibly held in engagement with the ground by virtue of a portion of the weight of the vehicle which normally transports the apparatus, being disposed on the anvil during operation of the equipment and with coupling of the anvil to the earth in immovable, tight engagement therewith, resulting in a novel and highly efficient sonic coupling link between the source of power and the transmitting medium to permit production of a sonic impulse of power sufficient to produce adequate reflection response in the ground notwithstanding the relatively small size of the impulse generator and the small power required to operate the same.

Also an aim of the invention is to provide sonic impulse generating apparatus including a massive anvil adapted to be disposed in engagement with the ground, a hammer movable into impactive engagement with the anvil, and coil spring means for acceleratedly driving the hammer toward the anvil with novel mechanism being provided for shifting the hammer away from the anvil against the action of the coil spring to thereby compress the latter and then effect release of such hammer at a point in predetermined spaced relationship from the anvil, whereby the hammer is driven toward and into impactive engagement with the anvil with sufficient force to produce a sonic impulse in the ground of magnitude capable of being used for seismic geological exploration purposes. In this respect, an additional important aim of the invention is to provide novel release mechanism which completely frees the hammer from the structure for shifting the hammer away from the anvil to thereby permit the hammer to move in an unimpeded manner under the action of the coil spring engaging the same so that the hammer will contact the anvil with maximum force and with the impact time being at a minimum value to assure maximum transfer of the energy into the ground in the form of a seismic pulse.

A still further important object of the invention is to provide apparatus and a method for generating a seismic impulse in the ground of predetermined cyclic characteristics and inducing a minimum of ground roll and other random noise which interferes with recording of the reflected signal with the seismographic equipment.

Other important objects and details of construction of the present apparatus and particulars of the method will become obvious or be explained in greater detail as the following specification progresses.

In the drawings:

FIGURE 1 is a side elevational view of apparatus for generating a seismic impulse employed in geological exploration surveys, with the machine being illustrated in its preferred embodiment and certain portions thereof being broken away and in section to reveal details of construction of the same, the carrier for the sonic impulse generating apparatus being illustrated fragmentarily and in partial section;

FIG. 2 is an end elevational view of the apparatus shown in FIG. 1 with certain parts thereof also being broken away and in section and a portion of the carrier vehicle being shown fragmentarily;

FIG. 3 is a fragmentary, rear elevational view of the sonic impulse generating apparatus and illustrating the lower portion of the generator with the hammer thereof in the uppermost position of the same;

FIG. 4 is an enlarged, horizontal, cross-sectional view taken on the line 4—4 of FIG. 1 and looking downwardly in the direction of the arrows;

FIG. 5 is a fragmentary, plan view of the upper part of the impulse generator apparatus; and FIG. 6 is an enlarged, fragmentary, vertical, cross-sectional view through a portion of the vertical screw and the clutch plate adjustably mounted thereon.

Explosives as a basis for the generation of seismic impulses in the ground, provide the sharp, high frequency, high intensity, maximum amplitude impulse which has long been responsible for successful seismic geological exploration surveys. The safety factors involved with explosives, the expense thereof, and the fact that explosives are not utilizable in certain areas, have led to other proposals including a method wherein a repetitious and cyclic injection of energy is introduced into the ground which creates a more or less sustained oscillation. Few, if any, of these pulsation methods have provided any results other than highly theoretical calculations and complicated experimental procedures, with none of such methods having thus far led to any widespread use in routine, practical, seismic surveys. Through continual research efforts over a long period of time, observers are now able to interpret the earth's response to a seismic impulse, or sharply decaying transient, in order to determine the characteristics of the earth at great depths below the surface thereof, and with the structure of the earth being surveyed through the medium of its response to the sonic impulse caused to be transmitted through the ground and then reflected upwardly to suitable recording equipment. The interpretive procedures form an art which has been established for some years and depends for the most part upon an experienced and competent observer. Predictable results are obtained from observance of recordings made with seismometers and capable of picking up sonic impulses produced by an explosion or similar source of energy. Surveys of this character have been successful primarily because of the comparative simplicity of the earth's response to a transient caused by a relatively sharp shock wave produced by an explosive or the like. However, the earth's response to a sustained oscillation, by comparison, is an exceedingly complex reaction and one which is not amendable to simple analysis. For resolution of complex records made from oscillatory sources of sonic impulses, it is necessary that the observer have a complicated array of instruments and that extensive analytical procedures be followed. It is to be understood that methods of this type are time consuming, involved and quite expensive.

Because of the widespread use and general acceptance of explosives, powder usually forms the criterion by which other seismic methods are evaluated. Workers in this field have evolved a term denoting the fundamental properties of explosives and designated "explosive strength" which means the ability of the powder to do work. During an explosion, substantially all of the useful work is done in the early stages of the expansion of the gases caused by detonation of the powder, and therefore the useful part of the expansion forms a very small percent of the total. The value of the energy given for the usual seismic explosive is approximately 295,000 foot pounds of energy per pound weight. Assuming that the useful part of the expansion is some 1% to 5% of the expansion leading to the total energy, it is possible that the useful energy created by the explosion would be of the order of 3,000 to 15,000 foot pounds of energy per pound weight. Weight dropping, however, is considerably more efficient than powder in the conversion of energy into a seismic pulse, with the relationships between weight dropping and powder being of the order of 1,000 to 1. In actual practice, the useful energy content of powder is considerably variable, dependent in large measure upon the conditions with respect to the geologic environment of the charge, and in particular the lithologic characteristics of the charge location, and the degree of confinement. Thus, although it is difficult to establish a particular value which may be assigned for a specific area and used as a basis for rigorous comparison, it is believed that the following formula is fairly accurate in serving as a value to be used in establishing the relationship between the various sonic impulse generating methods now available and in relationship to the present method and utilizing the apparatus herein disclosed:

$Q=$ energy equivalent of 1 lb. of powder$=5,000$ ft. lb.

Widespread experience in exploratory surveys based upon the use of explosives provides a means for establishing practical minimum values for generating a seismic transient impulse of such form and intensity as to provide a basis for seismic geologic exploration. Thus, exceedingly few areas are amenable to surveying with values of 0.10 Q, hence it is concluded that 0.10 Q forms the practical lower limit for seismic geologic exploration. The average values for fairly normal areas range from 5 to 20 Q, with values of the order of 100 to 200 Q representing the exceptions. It has been found that values ranging from 5 to 20 Q would represent the majority of areas within the continental United States.

A factor in practical seismic surveys not commonly recognized is the relationships between Q and the usable length of the record, or, geologically, the depth of penetration. In areas where the sedimentary sequence is relatively thin, the seismic travel path is very short and the attenuation of the seismic energy minimized. In such areas, values as low as 0.50 Q might provide a practical basis for seismic survey. Such areas, however, are relatively scarce and in many of the important producing regions the sedimentary sequence is quite thick, from 10,000 to 20,000 feet and possibly more. In such areas, fairly high Q's are a necessity. Of importance in this respect is the fact that the relationship between Q and the usable length of the record is almost an exponential function of the usable length. Thus, in an analysis of a specific area in Oklahoma, the Q would have to be multiplied by a factor of 7 to 10 times to increase the usable length of the record by 1 second.

In addition to the Q value of the sonic pulse, experimental work with respect to seismic exploratory procedures reveals that consideration must be given to the nature of the seismic impulse both from a quantitative and qualitative standpoint. Prior workers in this field generally employed explosives of various types in order to find the one best suited to the requirements and conditions of seismic exploration. Empirical studies were conducted wherein the effect on the earth ranged from a cumulative push ot an almost instantaneously applied shock of great violence. It was found that the high velocity violent shock provided by far the best results, and these experiments resulted in the widespread acceptance of very high velocity explosive compositions for geologic survey purposes.

The necessity for efficient coupling between the energy source and the transmitting medium was also determined to be an important factor in perfecting geological surveying methods, and it was found that tamping of the charge was considered essential in order to obtain maximum translation of the force of the explosion into a sonic impulse through the ground. Tests showed that the velocity of the detonation, and hence the useful power of the explosion, was in large measure dependent upon the degree of confinement.

The present seismic impulse generator as disclosed herein makes maximum utilization of the principles outlined above with respect to efficient coupling of the source of energy to the ground and production of a sonic impulse of high intensity, of predetermined cyclic characteristics, and with a minimum of secondary noise and ground roll which would interfere with recording procedures. The present apparatus is capable of producing a sonic impulse in the ground of sufficiently high Q factor to be useful for surveying purposes, and with substantially all of the energy produced by the machine being transmitted directly into the ground in substantially vertical direction for maximum reflection.

Sonic impulse generating apparatus is broadly designated by the numeral 10 in the drawings and is adapted to be mounted on a vehicle 12 in the nature of a truck having a pair of rearwardly extending frame channels 14 interconnected at the outer extremities thereof by a cross channel 16. The rear end of the vehicle is supported by wheel and axle assembly 18 provided with a pair of wheels 20 located outboard of each of the horizontal frame channels 14.

Apparatus 10 includes a main rigid, generally rectangular anvil 22 of solid steel and preferably of considerable size. In a typical unit, the anvil 22 has parallel upper and lower faces 24 and 26 respectively merging with a vertical side wall 28, and wherein the faces 24 and 26 are approximately twenty-eigth inches transversely of the frame of vehicle 12 and twenty-four inches longitudinally thereof, and the side wall 28 being approximately three inches high. These dimensions are illustrative only and it can be appreciated that the main consideration is to provide a relatively massive, rigid, substantially inelastic coupling plate for efficiently transmitting impulses into the ground as hereinafter defined.

Elongated, transversely rectangular spacer members 30 are mounted in overlying relationship to face 24 of anvil 22 adjacent respective corners thereof as illustrated in FIG. 4, and disposed between an upper horizontal plate 32 parallel with and spaced vertically from anvil 22. As indicated in FIG. 1, plate 32 is preferably of dimensions equal to those of anvil 22 and is positioned with the lower face 34 thereof in engagement with the upper extremities of corresponding members 30. Plate 32 and anvil 22 are provided with passages 36 therethrough in alignment with respective spacer members 30 for receiving respective ends of elongated connector rods 38 which pass through spacer members 30 and corresponding passages 36 as indicated in FIG. 2. Nuts 40 are threaded over the outer ends of rods 38 and are received in recesses 42 in plate 32 and anvil 22, with recesses 42 being of greater diameter than passages 36 and thereby permitting anvil 22 and plate 32 to be moved into tight engagement with opposed ends of members 30.

Four additional spacer members 44 located between plate 32 and anvil 22 and positioned between respective adjacent spacer members 30 inwardly thereof, are also bolted to plate 32 and anvil 22 through rods similar to 38 and held in place by nuts 40. A generally three-dimensionally rectangular frame 46 carried by spacer members 44 includes a number of rectangle-defining, horizontal crossbars 48 shown best in FIG. 3 interconnected by vertical angles 50 located at the corners of frame 46 as shown in FIG. 4.

The relatively heavy, massive, rigid, transversely rectangular hammer 52 positioned within frame 46 for vertical reciprocation therewithin, has a relatively flat upper surface 54 while the lower corners of hammer 52 are beveled as at 56 in FIG. 2 in order to assure proper engagement of hammer 52 with the upper face 24 of anvil 22. An elongated, vertical part or shaft 58 secured to the central portion of hammer 52 and extending upwardly from the upper surface 54 thereof, has a passage therethrough for receiving a transverse pin 60 which extends outwardly in opposed directions from shaft 58.

Mechanism for lifting hammer 52 and for acceleratedly driving the latter into impactive engagement with the upper face 24 of anvil 22 includes a relatively large coil spring 62 which is of sufficient length to engage the underface 34 of plate 32 as well as the upper surface 54 of hammer 52 and remain in somewhat compressed relationship. Coil spring 62 is preferably of a diameter approximately equal to the width of frame 46 as shown in FIG. 4, with the bar stock from which the same is formed being of the order of one to one and one-half inches in diameter.

The structure for lifting hammer 52 to a predetermined disposition in spaced relationship to the face 24 of anvil 22 and against the action of coil spring 62, includes an upright, three-dimensionally rectangular upper frame 66 which receives a rotary table 68 or equivalent mechanism which is also in turn secured to the upper face 70 of plate 32 within frame 66. As best shown in FIGS. 1 and 2, the rotary table 68 includes a main housing 72 having an outwardly extending, integral, tubular boss 74 provided with a bearing 76 rotatably supporting power shaft 78 which carries a sprocket wheel 80 on the outer extremity thereof. A bevel gear 82 secured to the inner extremity of shaft 78 for rotation therewith is disposed to mesh with bevel ring gear 84 which is secured to and carried by a tubular element 86 rotatably carried by housing 76 and provided with internal threads 88 in intermeshing relationship with the external threads 90 of an elongated member broadly designated 92. As indicated in FIGS. 1 and 3, plate 32 is provided with a central opening 94 therein which clears an annular clutch plate 96 which is secured to the lower extremity of element 86 for rotation therewith. An annular friction plate 98 is secured to the undersurface of clutch plate 96 in coaxial relationship to element 86. The member 92 extends downwardly through element 86 and openings therefor in plate 96 and friction plate 98 with the lower end of member 92 being positioned within frame 46 in direct overlying relationship to hammer 52. A coupling unit broadly numerated 100 (shown best in FIG. 2) is secured to the lower end of member 92 and comprises a tubular, sleeve-like member 102 having a central passage therethrough for telescopically receiving the upper extremity of shaft 58. The side wall of member 102 has a pair of generally L-shaped pin-receiving slots 104 therein for receiving corresponding ends of pins 60 as shown in FIG. 2. The surfaces 106 of member 102 defining the lower margin of the transverse portions of each of the slots 104 are inclined downwardly away from the vertical portion of corresponding slots as indicated in FIG. 2 to thereby force the outer extremities of pin 60 to move upwardly to a slight extent before such ends of the pin can move into the vertical portion of corresponding slots 104.

A generally rectangular, horizontally disposed plate 108 carried by the upper extremity and forming a part of frame 66 is provided with a central opening 110 therein for receiving a collar unit broadly designated 112 and rotatable relative to plate 108. As indicated in FIGS. 1 and 5, unit 112 includes a central, generally cylindrical section 114 while a disc 116 is secured to section 114 in overlying relationship thereto as well as to the upper face of plate 108. An integral washer 118 is connected to the lower part of section 114 and underlies the lower surface of plate 108. Disc 116, section 114 and washer 118 are provided with aligned, rectangular openings 120 therethrough which complementally receive the upper, transversely rectangular segment 122 of member 92 and permitting the latter to reciprocate relative to frame 66 through collar unit 112. Disc 116 is provided with a pair of radial, marginal notches 124 and 126 therein, while an integral, outwardly extending, radial projection 128 and in substantially direct opposition to notches 124 and 126, is disposed to engage opposed stops 130 and 132 secured to the upper face of plate 108.

A hydraulic cylinder 134 (FIGS. 2 and 5) mounted on the upper surface of plate 108 through bracket means 135 and having a reciprocable piston rod 138 provides means for preventing rotation of collar unit 112 with respect to frame 66 by virtue of crank arm 136 operably coupled to piston rod 138. As shown in FIG. 5, arm 136 includes a central portion 139 rotatably carried in a horizontal position by sleeve assembly 140 mounted on plate 108, while arm portion 142 of crank 136 is operably connected to piston rod 138 for movement therewith through link portion 144. The outer projection 146 integral with central portion 139 is disposed to be received in corresponding notches 124 or 126 depending upon the position of collar unit 112 with respect to plate 108. It is to be understood that hydraulic fluid supply means is operably coupled to cylinder 134 for shifting piston rod 138 to and from the open position thereof and under the control of the operator of apparatus 10.

The means for rotating sprocket wheel 80 and thereby shaft 78 includes a hydraulic motor 148 shown in FIG. 2 having an output sprocket wheel 150 which effects rotation of sprocket wheel 80 through an endless chain 152 trained over sprocket wheels 80 and 150.

Means for operably mounting apparatus 10 on vehicle 12 includes a pair of upright mounting plates 154 and 156 secured to the upper face 70 of plate 32 adjacent the margins thereof proximal to opposed wheels 20 and disposed in parallel, horizontally spaced relationship as indicated in FIG. 2. A pair of mounting plates 158 and 160 are also secured to corresponding frame channels 14 of vehicles 12 in depending relationship thereto and in alignment with respective mounting plates 154 and 156. A pair of hydraulic cylinder assemblies 162 are provided for interconnecting plates 154 and 158 as well as plates 156 and 160 respectively and as shown in FIG. 2, the cylinder 164 of each of the assemblies 162 is joined to plates 158 and 160 respectively by connector means 166 while similar connector means 168 are employed to join the upper extremities of piston rods 170 of assemblies 162 to the corresponding upper extremities of mounting plates 154 and 156.

Inasmuch as it is contemplated that the vehicle 12 be driven from site to site with apparatus 10 in an inoperative condition, it is to be preferred that safety means be provided for maintaining apparatus 10 in the raised position thereof, and thus a number of chain and hook units 172 are secured to mounting plates 158 and 160 and adapted to be hooked into suitable eyes 174 mounted on opposed side walls 28 of anvil 22.

In order to permit displacement of pin 60 from coupling unit 100 when hammer 52 has reached a predetermined point above the level of anvil 22, a clutch plate 176 is adjustably mounted on threaded portion 90 of member 92. Clutch plate 176 is provided with an annular friction disc 178 on the upper surface thereof adapted to engage the friction plate 98 on clutch plate 96 when clutch plate 176 has been shifted to the upper end of its path of travel. Mechanism for preventing rotation of clutch plate 176 with respect to member 92 until the operator of apparatus 10 desires to adjust the disposition of clutch plate 176, includes a key 182 which is received in a notch 184 in plate 176 and is rotatable about a pin 186 extending transversely across notch 184. The threaded portion 90 of member 92 is provided with an elongated slot 180 therein for receiving key 182, while clutch plate 176 has a depression 188 therein immediately below notch 184, thereby permitting the outer extremity of key 182 remote from member 92, to be shifted into recess 188 when it is desired to remove key 182 from slot 180.

*Operation*

In utilization of apparatus 10, it is initially assumed that the latter is in the raised position thereof with the pistons 170 of assemblies 162 thereby extended to shift the entire sonic generator unit out of engagement with the ground and into disposition whereby the hook units 172 may be operably engaged with respective eyes 174.

When the site to be surveyed has been reached, the truck is maneuvered until the anvil 22 of apparatus 10 is in direct overlying relationship to the area at which it is desired to introduce a sonic impulse into the ground, whereupon the pistons 170 of cylinder assemblies 162 are further extended for a slight distance in order to permit the chain and hook assemblies to be released from respective eyes 174. Thereupon, fluid pressure is released from assemblies 162 and fluid is directed into the cylinder 164 thereof in the opposite direction to retract pistons 170 into respective cylinders 164 thereby shifting apparatus 10 downwardly and with anvil 22 moving into engagement with the ground. Downward movement of apparatus 10 is continued until wheels 20 of vehicle 12 have been raised off the ground as illustrated in FIG. 1, with the lower rectangular face 26 of anvil 22 in direct flat engagement with the ground.

It is initially assumed that the clutch plate 176 is in a predetermined disposition for causing compression of spring 62 to a desired extent, and thus lifting of hammer 52 is accomplished by actuating hydraulic motor 148 through the hydraulic system carried by vehicle 12. During actuation of hydraulic motor 148, the sprocket wheel 150 thereof is caused to rotate to thereby effect rotation of sprocket wheel 80 through endless chain 152. Rotation of shaft 78 by sprocket wheel 80 causes bevel gear 82 to be rotated thereby effecting rotational movement of tubular element 86 which is in threaded interengagement with portion 90 of member 92. During such initial movement of tubular element 86, the hydraulic cylinder 134 is in the condition thereof as illustrated in FIG. 5 with the piston 138 retracted and the projection 146 of crank arm 136 located in notch 126 in disc 116 to thereby prevent rotation of unit 112 and member 92 which passes therethrough. Since member 92 is held against rotation, movement of tubular element 86 causes member 92 to be shifted upwardly whereby coil spring 62 is compressed between hammer 52 and the lower surface 34 of plate 32.

Hammer 52 continues to move upwardly against the action of coil spring 62 until the friction disc 178 on plate 176 moves into frictional engagement with friction plate 98 of clutch plate 96.

Substantially simultaneously with engagement of friction disc 178 with friction plate 98, hydraulic fluid is introduced into cylinder 134 in a direction to force piston 138 outwardly thereby rotating crank arm 136 in a clockwise direction viewing FIG. 2, whereby projection 146 is displaced from notch 126 in disc 116. Locking of member 92 to element 86 through clutch plates 96 and 176, causes member 92 to be rotated through a short arc determined by the distance between stops 130 and 132 which are alternately engaged by projection 128 on disc 116. During rotation of member 92, pin 60 moves out of the horizontal portions of respective slots 104 and into the vertical sections thereof. It can be perceived that the outer extremities of pin 60 are now in dispositions to clear the shoulder defined by surfaces 106 whereby spring 62 forces hammer 52 downwardly into impactive engagement with the upper face 24 of anvil 22. During downward movement of hammer 52, it is to be pointed out that the same is completely free from member 92 and that shifting of hammer 52 toward anvil plate 22 is substantially unimpeded for maximum impactive engagement of the hammer with the anvil. The sonic impulse produced by engagement of hammer 52 with anvil 22 is translated directly into the ground through anvil 22 and with maximum efficiency by virtue of the fact that a substantial portion of the weight of vehicle 12 is disposed on apparatus 10.

Hammer 52 may be again shifted to the uppermost end of its path of travel for another sonic impulse generating cycle by initially directing hydraulic fluid into cylinder 134 in a manner to cause piston 138 to be retracted and thereby rotate crank arm 136 in a counterclockwise direction and shifting projection 146 into notch 124 in disc 116. Locking of member 92 against rotation through immobilization of unit 112, permits movement of member 92 downwardly by reversing the direction of rotation of sprocket wheel 80 which rotates shaft 78 and thereby bevel gear 82 in a direction to turn ring gear 84 and the tubular element 86 in a direction opposite to that during upward movement of member 92. The stop 130 causes disc 116 (FIG. 5) to be limited to a disposition whereby slot 104 in coupling unit 100 receives the outer extremities of pins 60 as member 92 reaches the lowermost end of its path of travel. Release of projection 146 from engagement with disc 116 within notch 124 and through actuation of cylinder 134 as outlined above, permits member 92 to be rotated sufficiently to cause pin 60 to move into the transverse horizontal portion of slots 104. Thus, apparatus 10 is in condition for another sonic impulse generating cycle upon shifting of hammer 52 to the uppermost end of its path of travel remote from anvil 22.

The impact force generated by contact of hammer 52 with anvil 22 may be varied by changing the location of clutch plate 176 on member 92. Clutch plate 176 may be shifted longitudinally of the threaded portion 90 of member 92 by the operator pushing downwardly on the outermost extremity of key 182 to thereby pivot the latter about the axis of pin 186. Movement of key 182 out of the elongated slot 180 in member 92, permits clutch plate 176 to be rotated in a direction to either move the latter upwardly or downwardly along the threaded portion 90 of member 92. It can be recognized that the relationship of plate 176 with respect to clutch plate 96 determines the point at which hammer 52 is released from coupling unit 100 as the hammer 52 is shifted upwardly by member 92 against the action of coil spring 62 compressed between plate 32 and the upper face of hammer 52.

The apparatus 10 may be readily lifted to a position out of engagement with the ground through the simple expedient of directing hydraulic fluid into respective cylinder assemblies 162 to extend piston rods 170 and thereby causing the entire generator to be moved to a level above the ground and with tires 20 reengaging the surface of the ground. As previously pointed out, if the apparatus 10 is to be moved a considerable distance, it is preferable that chain and hook units 172 be connected to respective eyes 174 to preclude accidental displacement of apparatus 10 from the raised position thereof and preventing the apparatus from engaging the ground if the hydraulic pressure within cylinder assemblies 162 should fail because of a leakage in the system or the like.

Tests conducted with apparatus 10 have shown that in order to produce seismic records of maximum detail and clarity, it is required that a minimum force be available for transmission into the ground to thereby permit valid surveys to be carried out. Utilizing the formula $f=mv/t$, it has been determined that $f$ should be equal to or greater than 40,000 pounds, $t$ should be equal to or less than 5 milliseconds impact time, $v$ should be equal to or greater than 20 feet per second and $m$ should be equal to at least 10 slugs (300 to 1,000 pounds weight optimum for the hammer); thus $ft=mv=200$ pound seconds.

Experiments with apparatus 10 have also shown that the effect of variations in the degree of sonic coupling between the impulse source and the earth with respect to energy transfer is relatively critical with respect to the efficiency of seismic impulse propagation. A recording of an impulse with an energy of 0.40 Q and with anvil 22 rigidly pressed into engagement with the earth by the weight of truck 12, shows that the recorded reflections are readily readable to a record time of something over 1 second, with the band at 0.70 second being fairly clear. However, with the same energy level but without the weight of truck 12 on anvil 22, the low frequency roll level is very high and the band at 0.70 second cannot be distinguished at all in view of the high level of noise. The reflections at 1 second are very poorly developed under these conditions and do not produce a record which can be read with any degree of assurance.

Another important advantage in utilization of apparatus 10 for the production of sonic impulses to be utilized in geological exploration, is the fact that anvil 22 translates substantially all of the impact force of the hammer against the anvil, directly into the ground. Furthermore, the present apparatus produces a pulse of predetermined optimum characteristics and which comprises a high frequency pulse of from 50 to 75 cycles per second. This substantially eliminates ground roll as referred to above and minimizes random noise on the record which interferes with correct reading of the reflections of the sonic impulse in the ground.

Having thus described the invention what is claimed as new and desired to be secured by Letters Patent is:

1. In apparatus for generating a sonic impulse employed in seismic geological exploration, a massive coupling plate element having opposed, generally flat major faces, said element being adapted to be positioned during use thereof with one of said faces of the same in substantially horizontal, flat engagement with the ground and entirely supported thereby; an upright frame assembly on said plate element and provided with a member in overlying relationship to said plate element; a massive hammer reciprocable vertically in said frame assembly and disposed to impactively engage the other face of said element, said hammer being of sufficient size to generate a single recordable sonic impulse in the ground and being provided with an upright part on the upper surface thereof and a transverse pin through said part extending outwardly therefrom; structure carried by the frame assembly and engageable with the hammer for shifting the latter vertically from said element to a position thereabove and for releasably maintaining the hammer in said position, said structure including a vertically shiftable component rotatably carried by said member, coupling means mounted on the lower end of said component engageable with said pin and releasable therefrom when the component is rotated in one direction, and means connected to said component for shifting the latter vertically and for rotating the same in said one direction when the hammer has been shifted to said position thereof; means on the frame assembly and operably coupled to said structure for instantaneously releasing the hammer from said structure for substantially frictionless movement of the hammer toward said element free from said structure; and means interposed between and engaging the hammer and said member respectively for acceleratedly driving the hammer toward and into impactive engagement with the element with sufficient force to produce said recordable sonic impulse in the ground, upon release of the hammer from said structure.

2. Apparatus as set forth in claim 1 wherein said component is threaded longitudinally thereof, said structure including power means in threaded interengagement with said component, and releasable latch means engageable with the component for preventing rotation of the latter whereby during operation of said power means while said component is latched against rotation by said latch means, the component is shifted vertically with respect to said frame assembly.

3. Apparatus as set forth in claim 2 wherein said coupling means comprises a tubular unit adapted to receive a portion of said part on the hammer in partial telescoped relationship and provided with substantially L-shaped slot means therein for receiving respective ends of said pin.

4. Apparatus as set forth in claim 2 wherein is provided a first clutch member operably coupled to said power means and rotatable thereby, and a second clutch member secured to and carried by said component and disposed to engage said first clutch member as said hammer is moved into said position thereof, the component being rotated in said one direction thereof by the power means upon interengagement of said clutch members.

5. Apparatus as set forth in claim 2 wherein the upper portion of said component is of transversely polygonal configuration, said latch means including a rotatable collar surrounding said polygonal portion of the component and having a polygonal opening therein complemental with and receiving said component, and means engageable with said collar for releasably preventing rotation of the collar relative to said frame assembly.

6. Apparatus as set forth in claim 4 wherein is provided means shiftably mounting the first clutch member on said component to permit the disposition of the first clutch member to be varied relative to the second clutch member and when the component is in the same relative location thereof.

7. In apparatus for generating a sonic impulse employed in seismic geological exploration, a massive coupling plate element having opposed, generally flat, planar major faces, said element being adapted to be positioned during use thereof with one of said faces of the same in substantially horizontal, flat, complemental engagement with the ground and entirely supported thereby; an upright frame assembly on said plate element and provided with a member in overlying relationship to said plate element; means engaging said frame assembly to force the plate element into firm engagement with the ground under a relatively high pressure; a massive hammer reciprocable vertically in said frame assembly and disposed to impactively engage the other face of said element, said hammer being of sufficient size to generate a single sonic impulse in the ground; structure carried by the frame assembly and engageable with the hammer for shifting the latter vertically from said element to a position thereabove and for releasably maintaining the hammer in said position; means on the frame assembly and operably coupled to said structure for instantaneously releasing the hammer from said structure for substantially frictionless movement of the hammer toward said element free from said structure; and means interposed between and engaging the hammer and said member respectively for acceleratedly driving the hammer toward and into impactive engagement with the element with sufficient force to produce said recordable sonic impulse in the ground, upon release of the hammer from said structure.

8. Apparatus as set forth in claim 7 wherein said frame assembly is adapted to be mounted on a vehicle, said means to force the plate element into engagement with the ground including at least one hydraulic cylinder assembly having a piston unit and a cylinder unit, one of said units being pivotally secured to said frame assembly and the other of said units being adapted to be coupled with said vehicle for maintaining the frame assembly in any selected relationship with respect to the vehicle.

9. In apparatus for generating a sonic impulse employed in seismic geological exploration:
  a massive coupling plate element having opposed, generally flat major faces, said element being adapted to be positioned during use thereof with one of said faces in substantially flat engagement with the earth and entirely supported thereby;
  a frame assembly on said element and provided with a member in overlying relationship to said element;
  a massive hammer reciprocable vertically in said assembly between the element and said member and disposed to impactively engage the other face of said element;
  a large, upright coil spring having a vertical central axis defining its line of action and a pair of opposed, upper and lower ends, said spring being disposed between said hammer and said member with the lower and upper ends thereof engaging the hammer and the member respectively;
  structure carried by said assembly and engageable with said hammer for shifting the latter vertically upwardly along said axis in direct opposition to the line of action of said spring to thereby effect substantial compression thereof, and for releasably maintaining said hammer spaced from said element under the force of the compressed spring; and
  means on said assembly and operably coupled to said structure for instantaneously releasing the hammer from said structure for substantially frictionless movement of the hammer toward said element free from said structure along a downward vertical path extending axially of the spring, whereby the hammer is acceleratedly driven by the spring into impactive engagement with the element to generate a single recordable sonic impulse in the earth.

References Cited by the Examiner

UNITED STATES PATENTS

| | | | |
|---|---|---|---|
| 1,753,368 | 4/30 | Du Bois-Reymond | 340—12 |
| 1,925,289 | 9/33 | Strobel | 173—119 |
| 2,055,001 | 9/36 | Blomquist | 173—119 |
| 2,252,017 | 8/41 | McCrery | 173—119 |
| 2,519,477 | 8/50 | Kind | 173—118 |
| 2,620,162 | 12/52 | Pennington | 173—119 |
| 2,975,761 | 3/61 | Fairchild | 92—84 X |
| 3,024,861 | 3/62 | Clynch | 181—.5 |
| 3,053,220 | 9/62 | Sawyer | 181—.5 |
| 3,106,982 | 10/63 | Wade | 181—.5 |

FOREIGN PATENTS 16,288   7/11   Great Britain.

BENJAMIN A. BORCHELT, *Primary Examiner.*

CHARLES W. ROBINSON, CHESTER L. JUSTUS, SAMUEL FEINBERG, *Examiners.*